US005721537A

United States Patent [19]

Protas

[11] Patent Number: 5,721,537

[45] Date of Patent: Feb. 24, 1998

[54] PAGER-RECORDER AND METHODS

[76] Inventor: Marlyne Protas, 2251 E. Ocotillo Rd., Phoenix, Ariz. 85018

[21] Appl. No.: 487,812

[22] Filed: Jun. 7, 1995

[51] Int. Cl.[6] .................... H04B 7/00; H04M 1/64

[52] U.S. Cl. .................... 340/825.44; 455/38.1; 455/38.2; 379/70; 379/71

[58] Field of Search .................... 340/825.44, 825.72, 340/825.69; 379/70, 71; 455/79, 38.1, 38.2

[56] References Cited

U.S. PATENT DOCUMENTS 4,356,519 10/1982 Cogdell, Jr. .................... 360/61

5,307,059 4/1994 Connary et al. .................... 340/825.44

5,390,362 2/1995 Modjeska et al. .................... 455/38.1

*Primary Examiner*—Michael Horabik

*Assistant Examiner*—Anthony A. Asongwed

*Attorney, Agent, or Firm*—Louis J. Hoffman

[57] ABSTRACT

A hand-held device contains a paging receiver and a microphone to accept dictation of messages. A common digital data store holds received transmissions and dictated messages.

20 Claims, 4 Drawing Sheets

PAGER-RECORDER AND METHODS

FIELD OF THE INVENTION

This invention relates to the field of paging receivers having the capability of storing transmitted call signals and dictated messages.

BACKGROUND OF THE INVENTION

Pocket or "belt-clip" pagers have attained widespread popularity. In particular, digital pagers have achieved the capability of responding to tone, voice, or data messages encoded in various formats. Some known pagers have the ability to store a series of data or voice messages received over the airwaves and selectively or sequentially retrieve stored messages. Recently, pagers have been developed that utilize limited digital (microprocessor-controlled) conversion and storage. For example, U.S. Pat. No. 4,873,520, issued to Fisch et al. and U.S. Pat. No. 4,965,569, issued to Bennett et al., both of which are assigned to Motorola, Inc., discuss a digitized stored-voice pager, and are hereby incorporated by reference. However, even such digital pagers operate to store and replay only messages received from a paging transmitter.

Pagers are designed for users who are frequently in locations at which it is inconvenient to reach the user by conventional means, such as by telephone. For example, persons being paged are typically not in an office or home location, but rather, in a car, outside, on an factory floor, or in a public place. Thus, a message received on a pager frequently arrives at a time or location at which the user may find it difficult to react to the message. For example, a person receiving a page while driving may return a call from a mobile telephone or a pay phone. In such circumstances, it is often inconvenient to record follow-up information related to or arising out of the message received by pager.

Transportable recording devices, ranging from simple paper notepads to voice-activated dictating machines to digital message stores exist. However, in the circumstances described above, such items may be unavailable or inconvenient to use, and, in any event, in accordance with the invention, are unnecessary.

SUMMARY OF THE INVENTION

It is therefore an object of the present invention to provide a more useful digital paging receiver.

It is another object of the invention to provide a paging receiver that can record not only received messages, but also user notes.

It is another object of the invention to eliminate the need to carry a recording device for persons carrying digital pagers.

It is another object of the invention to provide a shared-memory paging receiver.

The inventive apparatus achieves those and other objects in a unitary device comprising a receiver, a microphone, a message store, a speaker, and appropriate memory controls, including at least "record" and "playback" controls. A decoder acts as a common interface between a digital memory and the input data. A priority circuit arbitrates the access to the shared memory.

Accordingly, in the inventive design, the user may access the memory to retrieve a received message or to store an additional note or message for later retrieval. The inventive design provides useful added functionality over known paging receivers.

BRIEF DESCRIPTION OF THE DRAWINGS

The novel features of the invention are described with particularity in the claims. The invention, together with its objects and advantages, will be better understood after referring to the following description and the accompanying figures, in which common numerals are intended to refer to common elements.

DETAILED DESCRIPTION OF THE PREFERRED EMBODIMENTS

Figure 1:
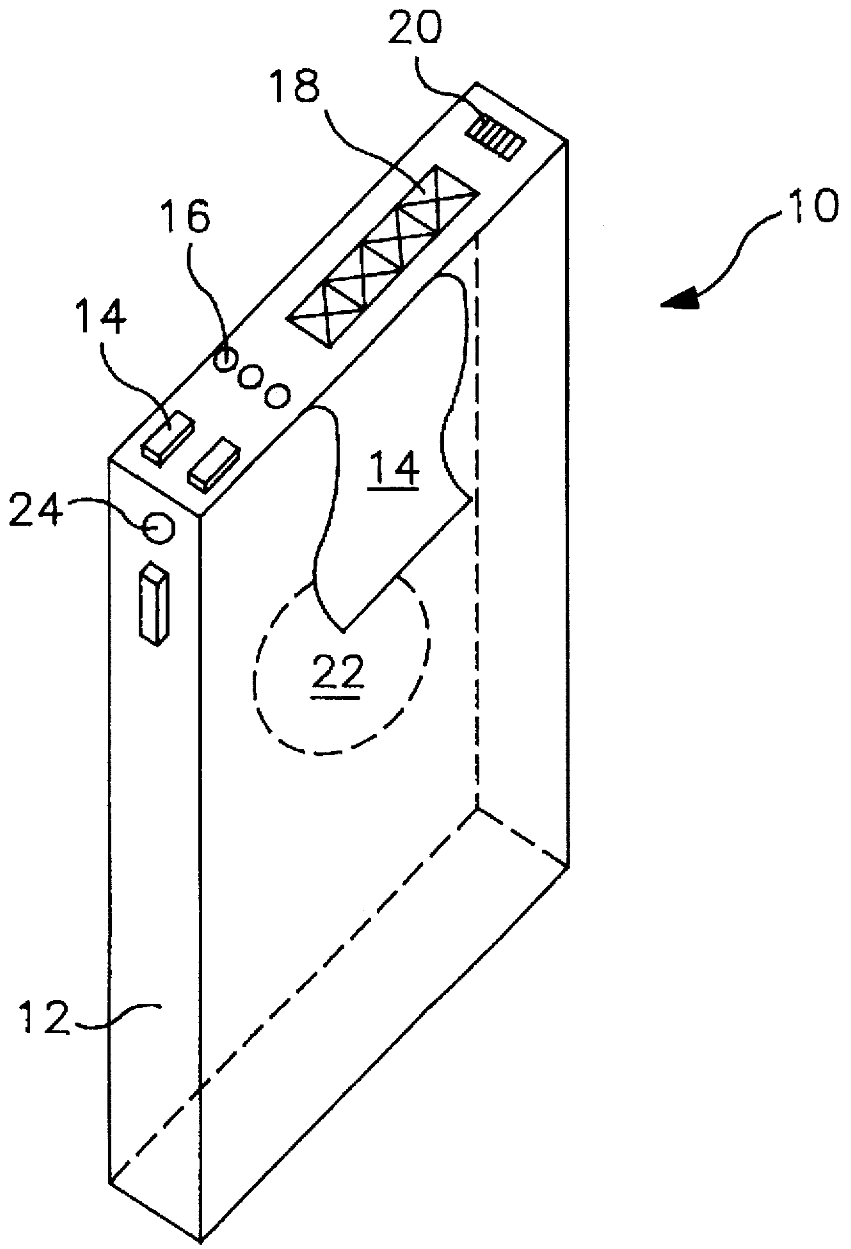
FIG. 1 illustrates an exterior view of an embodiment of the invention.
Figure 2:
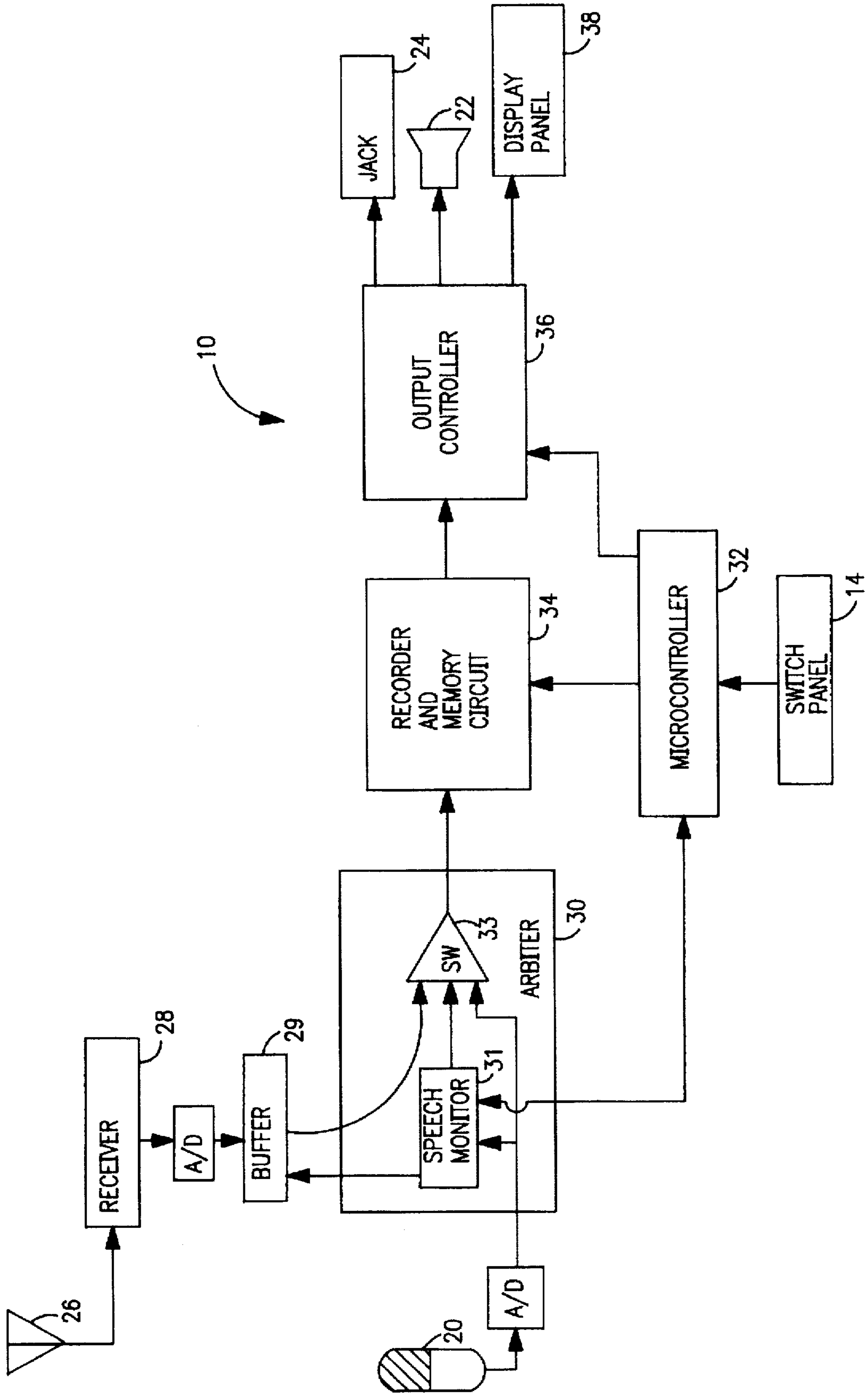
FIG. 2 shows a schematic diagram demonstrating the overall system of an embodiment of the invention.

FIG. 1 shows a unitary, hand-held pager-recorder 10 in accordance with the invention, also shown in block-diagram form in FIG. 2. Case 12 can be clipped to a belt or other article of clothing by clip 14 and contains a plurality of hand-activated control switches forming a switch panel 14, which may be located at various convenient places on case 12. Bistable switches or monostable buttons can be used. Display indicators 16 provide a visual confirmation of the state of operation of device 10. LCD display panel 18 permits visual output of instructions or message text. Microphone 20, integrated together with device 10, provides additional capability of storing messages, as more fully described below. Speaker 22, shown in the view of FIG. 1 as flush against the reverse side of case 22, provides an audible output. I/O jack 24 permits extraction of stored data. Other features shown in subsequent figures are also included, but not shown, in FIG. 1.

FIG. 2 shows antenna 26, suited for receiving paging signals, also supported within case 12. Receiver 28, coupled to the output of antenna 26, decodes paging signals and passes those addressed to the individual unit to arbiter 30. Microphone 20 is also coupled to arbiter 30. The function of arbiter 30 is to arbitrate between input signals received from receiver 28 and signals received through microphone 20, to avoid conflict. In the event that the recording arrangement is insufficient to permit simultaneous recording from both sources, arbiter 30 grants higher priority to messages from receiver 28, which are not conveniently repeatable. Arbiter 30 is controlled by microcontroller 32, and in an alternate embodiment may be integrated therewith.

The arbitrated output is passed to recorder/memory circuit 34 and stored in the next-available memory "slot," under the control of microcontroller 32. Memory 34 preferably comprises a digital storage. For example, a series of patents assigned to Information Storage Devices, Inc. of Santa Clara, Calif., including U.S. Pat. Nos. 4,890,259 and 4,989,179, disclose a high-density integrated circuit for recording and playback of analog signals, using digital storage, termed a "tape recorder on a chip." Associated recording techniques to reduce signal error (U.S. Pat. Nos. 5,126,967 and 5,220,531) may also be used in connection with this inventive apparatus. Such devices may be cascaded (U.S. Pat. No. 5,164,915) to permit an expandable-size memory. The memory can be organized to store each incoming message in a fixed-size memory slot or arranged so as to permit a varying-size message, with initial or terminal addresses being saved in an index area of memory 34 or a non-volatile memory, such as a RAM, associated with microcontroller 32. The patents identified in this paragraph are hereby incorporated by reference. However, it is possible to utilize more simple revisions of the complete designs shown in those patents; for example, clock addressing for "fast forward" or "first reverse" may be unneeded. Similarly, it is possible to organize the memory in a circular fashion, so that new messages simply overwrite old ones, thereby eliminating the need for an "erase" function. However, in a more elaborate device, additional functionality may be desired, to permit greater user control over the recorded date.

Incoming pages are digitally stored at an appropriate location of memory 34 and an alert generated. For example, in FIG. 2, storage of a page message can result in passage of a signal to output controller 36, which will generate an audible signal of a predetermined type on speaker 22. Alternatively or additionally, a notice can be passed to display panel 38, which can result either in an LCD lighting up on panel 16 or in a notice being displayed on LED panel 18. Another alternative (selected by either the manufacturer or as a user option) is a tactile notification system, such as vibration device (not shown) incorporated in case 22.

The decoded page message may contain voice data, an electronic message, or both. Different portions of the message may be prefaced with an electronic signal indicating the type of data. For example, suppose a portion of the page is intended for display on LED panel 18, such as a telephone number, it may be sent immediately following a coded sequence recognizable by microcontroller 32 as an instruction to display the following data. Another portion of the page message intended for storage as voice information can follow a different signal. A third portion of the page, intended for storage but not interpreted as voice data, can follow yet a third signal. For example, if the storage capacity of the device is great enough or the compression algorithm sufficiently efficient, the page message may contain facsimile data, such as when reproduced through jack 24, capable of being printed as one or more pages of graphics or text. Non-voice data may be stored in memory 34 directly, together with voice data, each appropriately labeled, if memory 34 is suited for storing both sets of data. Alternatively, such as if circuit 34 is specialized for storing voice data only, a separate memory type, such as standard DRAM, may be used together with voice memory 34, also controlled by microcontroller 32, and non-voice data intended for storage routed to that memory instead.

Microphone 20 permits the user to dictate a voice message for later playback. The dictated message is stored in the same memory as the voice portion of the stored page messages, in the same fashion. The use of a shared memory permits the added functionality discussed in the background and summary of the invention sections above, with little added cost or complexity; as a first approximation, only the addition and interconnection of a microphone is needed. To activate microphone 20, the user depresses the appropriate one of the switches on panel 14, and depending on the arrangement, holds the switch in until the message is completed, or depresses the switch a second time to indicate completion of the message. If the memory 34 is arranged in "slots," a more sophisticated sequence of switching may be desired, to permit interruption in recording the user message without causing its division between two slots. For example, the record button can be a monostable switch, such as a spring-loaded pushbutton, pressing and releasing the button once can be defined as the command for both starting and pausing in the recording of a single voice message, and pressing and holding the button for a predetermined time can be defined as the command for terminating the message, thus ending the recording in the message slot. (In such an arrangement, it would be particularly desirable to assign one of the LCD's 16 to indicate that the device is in recording mode.) To save space, it is preferred to use a microphone 20 associated with voice-activation circuitry, so that pauses do not consume the necessarily limited storage space.

Playback functions are controlled by switch panel 14, which causes microcontroller 32 to issue command control signals to output controller 36, driving the appropriate ones of jack 24, speaker 22, and display panel 38, including LCD's 16 and LED's 18. All or part of the functions of output controller 36 may be integrated with microcontroller 32 in some systems, depending on the particular components used in the design. One or more switches on panel 14 is assigned to control visual output on LED panel 18 or audible playback on speaker 22. The playback switch, or another button, controls selection of the desired message from among the several "slots." Switch panel 14 can also be configured to perform any or all of the following functions: (1) erasure of a particular message to free up room for new data; (2) output of non-voice data through jack 24; (3) activation and deactivation of audible warnings or elements, such as the incoming-message indicator; (4) power on/off or battery conservation functions; (5) speaker-volume or microphone-level control; (6) a "do not disturb" function; (7) changing the length of each "slot" or the quality of messages stored therein (there is a tradeoff between quality and condensation); (8) resetting the system; or (9) any other known pager or recording functions.

Because a message received by wireless transmission cannot easily be repeated, arbiter 30 should preferably grant pager messages priority over dictated voice messages. Thus, system 10 can be configured so that receipt of a message addressed to the pager causes receiver 28 to issue an interruption signal, directing arbiter 30 to record decoded voice data received by antenna 26 instead of dictated voice data from microphone 20, and also to issue an interrupt signal, such as an incoming message tone or a different sound sequence indicating an interrupted dictation, over speaker 24 or another output device.

Figure 4:
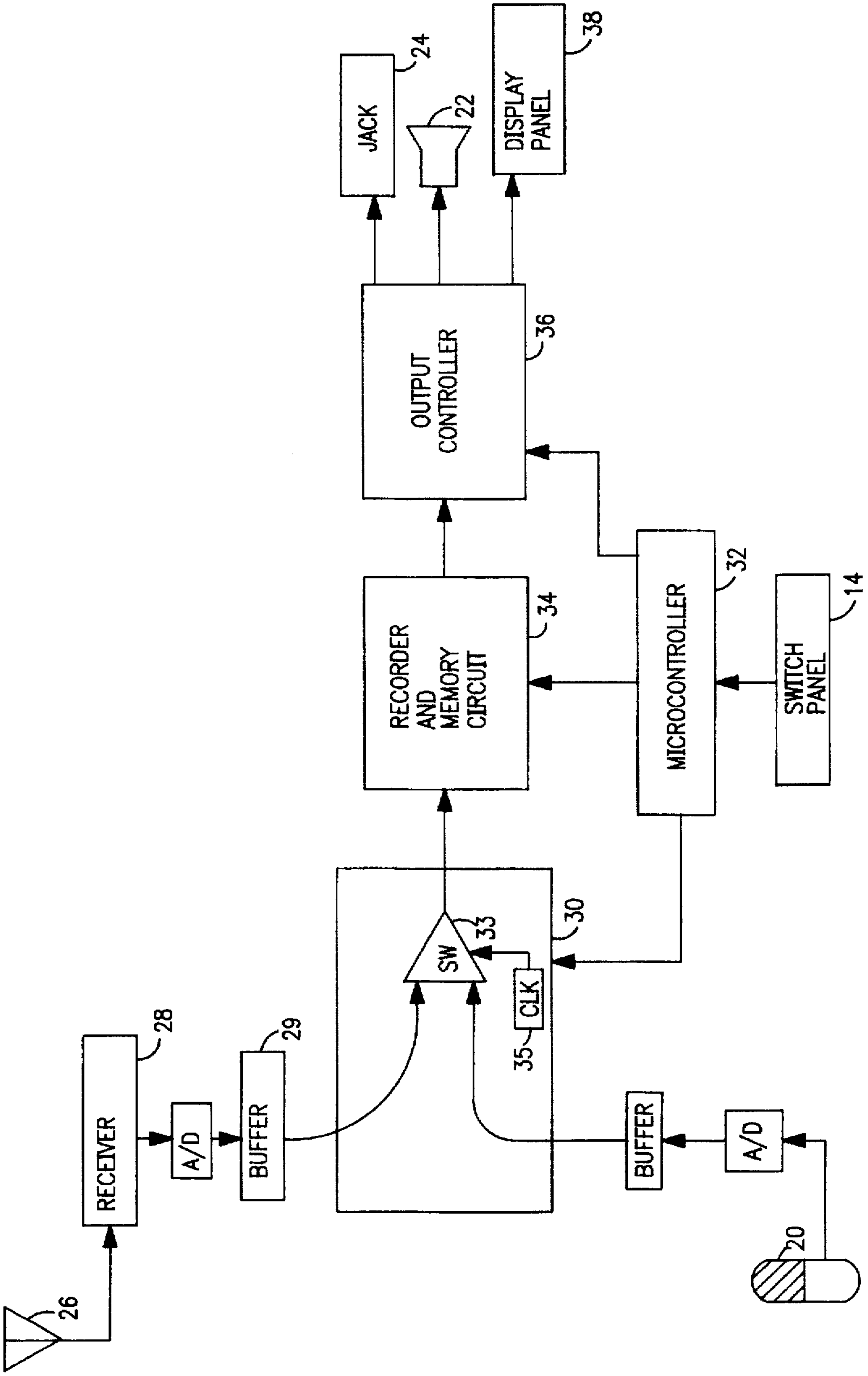
FIG. 4 shows a schematic diagram showing an alternative embodiment of FIG. 2.

Such a system, while functional, results in the disadvantage of interrupting the user, possibly in the middle of a thought, when a pager message arrives, or prematurely terminating a message being dictated. That disadvantage can be overcome by a more sophisticated system, which can record data from both inputs simultaneously. For example, most speech contains pauses, such as between sentences, phrases, and words. While those pauses may not be extremely long in "human time," they are quite long in "microprocessor time," as are the time during which phonemes are sounded. The signal quality of the speech can thus be maintained even if the sounds are sampled rather than monitored continuously, and a variety of sampling techniques are known in the speech-processing art. Thus, data received at receiver 28 can be forwarded to recorder circuit 34 during gaps in monitoring of speech "simultaneously" being spoken into microphone 20, as detected by speech monitor 31. Such a technique is often referenced as "time-slicing." Because digital recorder 34 can be re-addressed quickly, time based switching circuit 33 of arbiter 30 can cause recorder 34 to switch rapidly back and forth between the "slot" into which the dictated message is placed and the "slot" into which the page is placed. Optionally, an IC buffer 29 may be placed in or in association with arbiter 30 or receiver 28 and coupled to permit temporary storage of data from one source while arbiter 30 is controlling the direction of data into recorder 34 from the other source. Such an alternative embodiment is shown in FIG. 4, in which time-based switching circuit 33, switched by clock 35 of FIG. 4 rather than speech monitor 31 of FIG. 2, switches the digitized, buffered outputs of receiver 28 and microphone 20. A suitable form of "packet switching" known in the field of telephony may be substituted for the above-detailed technique and hardware design. The same systems can be used to swap between playback and page functions.

Although the control functions of microcontroller 32 are designated with arrows in FIG. 2, it is apparent from the above discussion that information concerning the state of the system will be passed from the various coupled components to microcontroller 32. It is also apparent that microcontroller 32 may be a more complex microprocessor as is commercially available or based on a custom design. Power for the system may be provided by an on-board battery (not shown). Associated circuitry, such as ROM units store program information, display drives, and clock crystals, are omitted from FIG. 2 but well within the design capability of the ordinarily skilled artisan. Address decoding is performed in the same fashions as with all pagers.

Figure 3:
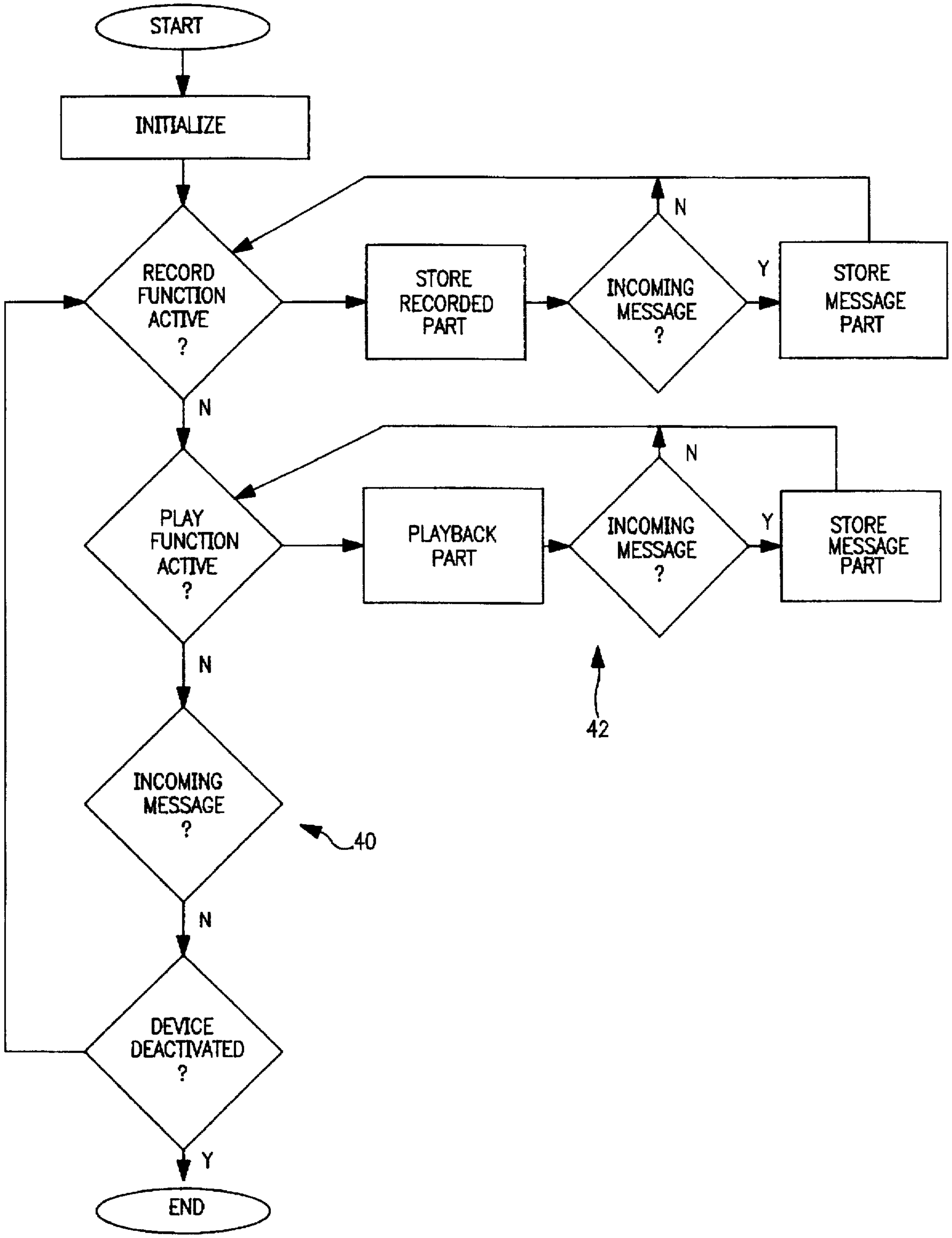
FIG. 3 shows a flowchart summarizing the operation of a control system useful in connection with the invention.

FIG. 3 shows a simplified flowchart illustrating an example program for control in accordance with the embodiment of the invention disclosed in the preceding paragraphs. After the device is activated, microcontroller 32 polls through the various primary functions as shown in the left column 40 of FIG. 3. If either the record or playback functions (which are mutually exclusive) are active, the device checks repeatedly for an incoming message. If a page message is being received, time-sliced storage is performed, as shown in the right-hand rows 42 of FIG. 3. If the incoming message ends before the function is completed, the program cycles within the row, storing or playing back a segment at a time, until the message is completely stored or played back. If the incoming message lasts after completion of the function, or if neither function is activated, the program cycles along column 40 until the incoming message is stored completely. Finally, the program checks for switch deactivation.

In that it is a simplified flowchart, FIG. 3 omits a number of control functions that would be desirable or useful in a preferred embodiment. For example, LCD's 16 would indicate the state of the device, playback could be handled differently between audio output on speaker 22 and textual output on LED panel 18, a transfer function or option could be present through jack 24, counters or pointers would monitor the "next" or "current" message locations during either input or output, and appropriate operations of switches 14 would be monitored. All of those and other above-described functions can be under the control of microcontroller 32, and suitable modifications and amplifications of the flowchart of FIG. 3 can be accomplished by the skilled artisan without undue experimentation.

A number of alternative programming techniques are available as substitutes for the arrangement shown in FIG. 3. For example, the polling system can be replaced by a push-pop interrupt scheme that provides temporary or exclusive control to the paging message storing function. The flowchart can alternatively be depicted as a state machine or by using subroutines. The control operations can be modified to permit implementation of the various alternatives described elsewhere in this specification or the incorporated references.

Although the invention has been described with reference to specific embodiments, many modifications and variations of such embodiments can be made without departing from the innovative concepts disclosed.

Thus, it is understood by those skilled in the art that alternative forms and embodiments of the invention can be devised without departing from its spirit and scope. The foregoing and all other such modifications and variations are intended to be included within the spirit and scope of the appended claims.

I claim:

1. A multi-function recording apparatus mounted in a portable case comprising:

(a) an addressable receiver;

(b) a microphone;

(c) a digital storage circuit containing an addressable memory store having input lines coupled to the addressable receiver and the microphone;

(d) a controller coupled to and controlling (i) the input couplings to the digital storage circuit and (ii) the addressing of the memory store for data passed over the coupled input line;

(e) wherein the controller includes a time-based switching circuit configured to sequentially switch the input couplings to the digital storage circuit between the microphone and the addressable receiver; and (f) an output device coupled to the memory store and controlled by the controller to couple to a selected address of the memory store.

2. The apparatus of claim 1 wherein the output device comprises a loudspeaker and wherein the digital storage circuit is an integrated circuit supporting an audio-signal interface and a random-accessible digital memory storage.

3. The apparatus of claim 2 wherein the controller further comprises an output controller and a microcontroller.

4. The apparatus of claim 2 wherein the controller further comprises a speech monitor configured to detect periods of silence in speech being spoken into the microphone, and wherein the time-based switching circuit is responsive to the speech monitor.

5. The apparatus of claim 1 wherein the time-based switching circuit is responsive to control signals indicating the simultaneous activation of the microphone and the addressable receiver.

6. The apparatus of claim 2 wherein the output device further comprises a visual display device, and wherein the digital storage circuit further comprises a code-text translator circuit coupleable to the input line that couples the addressable receiver and the memory store, and wherein the controller is coupled to the translator circuit and controls the display on the visual display device of a text representation of coded signals received by the addressable receiver.

7. The apparatus of claim 1 further comprising a counter incrementally responsive to receipt of a message by the addressable receiver and decrementally responsive to playback of a stored message on the output device, wherein the counter is coupled to the controller, and wherein the controller is responsive to the counter to control the addressing of the memory store for both input and output.

8. The apparatus of claim 2 wherein the audio-signal interface is coupled to both of the input lines to the digital storage circuit.

9. A multi-function message control device comprising:

(a) means for receiving a remotely generated addressed paging message;

(b) means for digitally encoding locally generated audio signals;

(c) means for storing digitally encoded paging messages and digitally encoded audio signals;

(d) means for transducing digital signals from the storage means representing a select message;

(e) means for audibly playing the transduced signals; and (f) means for selectively controlling the storing means so that the storing means is sequentially switched to store paging messages at some times and locally generated audio signal at other times.

10. The device of claim 9 wherein the controlling means comprises a time-slice controller.

11. The device of claim 9 further comprising means for visually representing data in the transduced signals.

12. The device of claim 9 wherein the storage means comprises addressing means for controlling the location of stored and transduced messages.

13. The device of claim 9 wherein the receiving means comprises means for receiving an encoded, remotely addressed voice message.

14. A method for receiving and storing both remotely and locally generated messages comprising:

(a) receiving selected transmitted, addressed remote messages;

(b) inputting locally generated voice messages;

(c) storing data corresponding to both received and locally generated voice messages, each at a selected location, by sequentially switching between received messages and locally generated voice messages; and (d) later reproducing and audibly outputting a message stored at a selected location.

15. The method of claim 14 further comprising arbitrating between simultaneously received remote messages and voice messages.

16. The method of claim 15 further comprising time-slice storing of said simultaneously received stored messages.

17. The method of claim 16 further comprising digitally encoding the voice messages.

18. The method of claim 14 further comprising visually outputting the selected message.

19. The method of claim 14 further comprising automatically counting the number of stored messages that have not been previously reproduced and displaying the count.

20. The method of claim 14 further comprising automatically counting the number of stored messages that have not been previously deleted and displaying the count.

* * * * *